Figure 1:
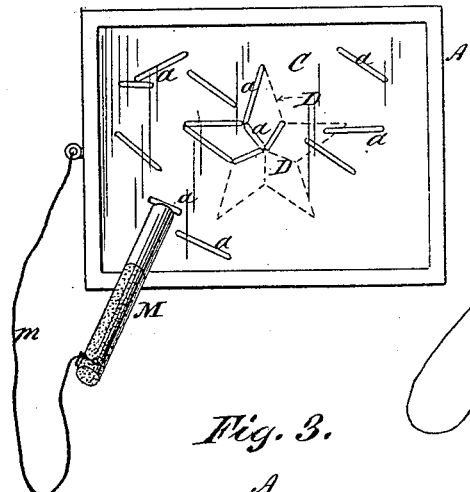

273. AMUSEMENT DEVICES, GAMES.
153

(No Model.)

G. W. MIATT.
MAGNETIC TOY.

No. 417,931. Patented Dec. 24, 1889.

Witnesses:
D. W. Gardner
G. T. Miatt

Inventor:
Geo. W. Miatt

UNITED STATES PATENT OFFICE.

GEORGE W. MIATT, OF BROOKLYN, NEW YORK.

MAGNETIC TOY.

SPECIFICATION forming part of Letters Patent No. 417,931, dated December 24, 1889.

Application filed May 4, 1889. Serial No. 309,645. (No model.)

*To all whom it may concern:*

Be it known that I, GEORGE W. MIATT, a citizen of the United States, residing in the city of Brooklyn, in the county of Kings and State of New York, have invented certain new and useful Improvements in Magnetic Toys, of which the following is a specification sufficient to enable others skilled in the art to which the invention appertains to make and use the same.

My invention relates to magnetic toys, and, as shown herein, may be designated as a "magnetic puzzle," since a magnet is utilized to effect the arrangement of movable paramagnetic objects in performing the game or task.

The essential characteristic of my invention consists in the shielding of a number of loose paramagnetic objects lying upon a supporting-bed from direct contact with a magnet held in the hand of the user of the toy by means of a fixed transparent plate, which permits the movements of the paramagnetic objects induced by movements of the magnet to be observed. The paramagnetic objects may be of any desired form, and it is also obvious that the puzzle or task of causing them to assume prescribed relative positions may be varied indefinitely without departing from my invention.

A secondary feature of my invention consists in providing the surface of the said supporting-bed with a prescribed design to serve as a guide or indication of the position which the paramagnetic objects are to be made to take by movements of the magnet. Such design may be pictured upon the bed, or it may be formed of raised configurations, which will, to such extent as may be desired, mechanically guide and control the movements of the paramagnetic objects. I thus produce a comparatively simple magnetic toy requiring in use the exercise of both skill and patience, and which is instructive as well as amusing. The interposition of the transparent shield, while preventing the contact and adhesion of the paramagnetic objects with the magnet, permits of their being readily seen and moved about by the player, while variation in the distance of the actuating-magnet and the tendency of the paramagnetic objects to cling together by reason of induced magnetism render the problem of arranging them entertaining and more or less difficult, according to the complexity of the design.

In the accompanying drawings I illustrate the use of different designs in presenting my invention in practical form, although I do not wish to confine myself strictly to any special form of construction of parts, the essential features of my improvements being present when the series of paramagnetic objects arranged upon a supporting-bed are used in conjunction with a transparent shield interposed between them and an actuating-magnet.

Figure 2:
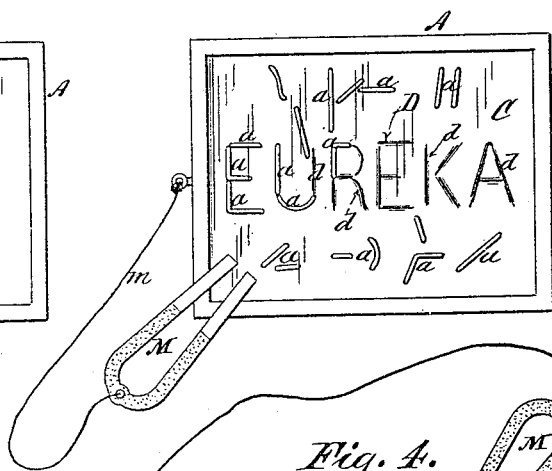
Figure 3:
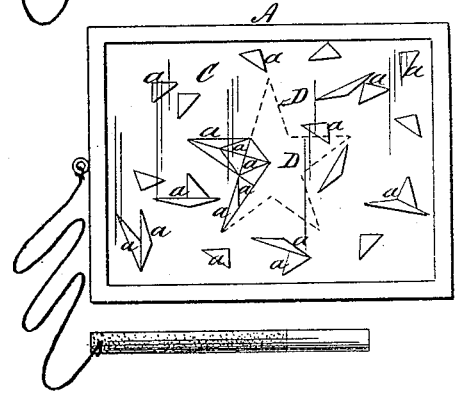
Figure 4:
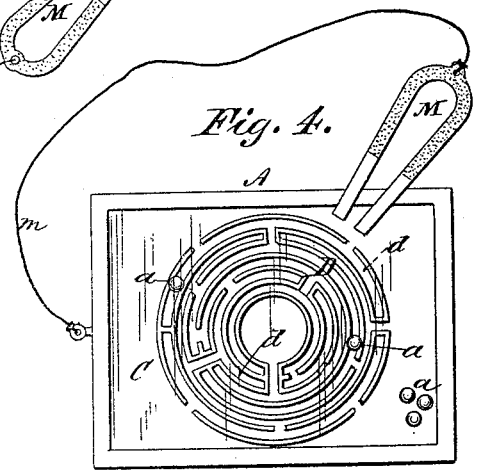
Figure 5:
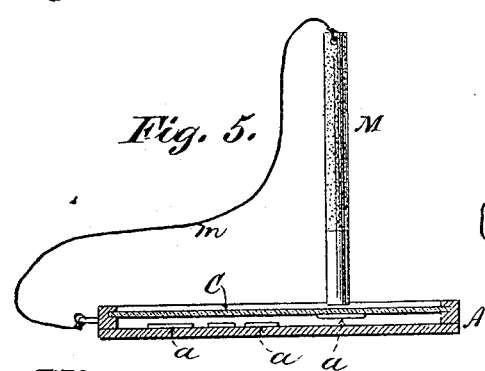
Figure 6:
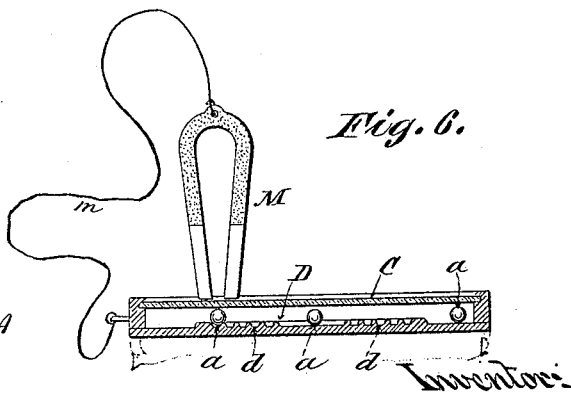

Figure 1 represents a top view of the device in which a series of paramagnetic objects are to be arranged into the form of a star, the actuating-magnet being in the form of a "bar-magnet." Fig. 2 is a similar view in which a series of paramagnetic objects are to be arranged to form a word, the actuating-magnet being in the form of a horseshoe-magnet. Fig. 3 is a view like Fig. 1, except that the star is to be formed of a series of triangular paramagnetic objects. Fig. 4 is a top view of the device in which the paramagnetic objects consist of a series of metal balls which are to be passed through a design in the form of a labyrinth of grooves. Fig. 5 is a longitudinal section illustrating the use of the actuating-magnet in either of the three first figures; Fig. 6, a similar view of Fig. 4.

A suitable receptacle A is provided for the reception of the series of paramagnetic objects *a a*, which latter are preferably, though not necessarily, completely inclosed and confined within the receptacle, which may be in the form of a box, the cover of which C consists of a sheet of glass or other transparent material.

It is obvious that the form and construction of the box or receptacle A may be varied at pleasure without deviating from my invention, the essential feature in this respect consisting in furnishing a support for the paramagnetic objects *a a* and for the transparent medium C, which is interposed between them and the actuating-magnet M. The latter is preferably, though not necessarily, attached by a flexible cord to the receptacle A, as indicated by the lines *m* in the drawings, and may be of either the bar or horseshoe pattern, the latter being the stronger and more effective form where the device is to be of cheap construction.

The solution of the puzzle consists in working out and arranging the paramagnetic objects $a\ a$ in the form of a prescribed design by aid of the actuating-magnet M, by which the individual sections are to be separated one from the other and moved into proper positions with relation to each other. It is obvious that the number and character of the designs that may thus be employed is practically unlimited; in fact, the device may be made without any visible pattern or design, and the puzzle thereby rendered more difficult of solution, if desired, without deviating from the essential feature of my invention. Again, the special form or construction of the paramagnetic objects is of secondary importance, provided they are capable of independent movement and relative arrangement.

In Fig. 1 the design D consists of a simple form of star dotted or otherwise outlined upon the floor of the receptacle A, while in Fig. 2 the design D consists of the word "Eureka" in the form of slight depressions or grooves $d\ d$, which receive the different paramagnetic objects $a\ a$ when brought into proper coincidence therewith by the magnet and dropped therein by its removal.

In Fig. 4 the paramagnetic objects consist of balls, which are to be drawn through the grooves $d$ of the labyrinth design D. The design D may be superposed upon the supporting-bed by drawing, painting, printing, or any other suitable means; or it may be configured directly upon the surface of the supporting-bed in intaglio or alto-rilievo.

The paramagnetic objects $a\ a$ may be made of different colors—as, for instance, when used in the form indicated in Fig. 3—thus rendering the design more attractive.

The use of the toy will be readily understood. The paramagnetic objects $a\ a$, having been shaken into disorder, the magnet M, acting through the transparent medium C, is employed to separate them and fit each piece into its allotted place in the design to be formed, the natural tendency of the sections to follow the magnet and to cling together rendering a considerable amount of skill and patience in manipulating the magnet essential to a successful solution of the puzzle, which, owing to the invisibility of the force employed in moving the sections $a$ and to the delicacy with which the magnetism may be made to act by varying the position and distance of the magnet M with relation to the transparent medium C, produces an especially fascinating and instructive device for amusement, said device, as before intimated, being capable of considerable variation and modification in form and arrangement without deviation from the spirit and intent of this invention.

What I claim as my invention, and desire to secure by Letters Patent, is—

1. In a magnetic toy, the combination, as and for the purpose herein set forth, of a supporting-bed, a transparent shield in proximity thereto, and a number of comparatively small paramagnetic objects loosely contained between the said bed and said shield.

2. In a magnetic toy, the combination, as and for the purpose herein set forth, of a supporting-bed exhibiting upon its surface a prescribed design, a transparent shield in proximity to said bed, and a number of comparatively small paramagnetic objects loosely contained between the said bed and said shield.

3. In a magnetic toy, the combination, as and for the purpose herein set forth, of a supporting-bed with raised or depressed configurations upon its surface according to a prescribed design, a transparent shield in proximity to said supporting-bed, and a number of comparatively small paramagnetic objects loosely contained between the said bed and said shield.

GEO. W. MIATT.

Witnesses:
D. W. GARDNER,
G. T. MIATT.